MASTER PISTON ACTUATOR

Filed Nov. 12, 1965 4 Sheets-Sheet 1

INVENTOR
CLARENCE C. FAY
BY Kramer & Sturges
ATTORNEYS

MASTER PISTON ACTUATOR

Filed Nov. 12, 1965 4 Sheets-Sheet 2

INVENTOR
CLARENCE C. FAY

BY Kramer & Sturges

ATTORNEYS

Feb. 27, 1968 C. C. FAY 3,370,426

MASTER PISTON ACTUATOR

Filed Nov. 12, 1965 4 Sheets-Sheet 3

INVENTOR
CLARENCE C. FAY

BY Kramer & Sturgis

ATTORNEYS

INVENTOR
CLARENCE C. FAY
BY Kramer & Sturges
ATTORNEYS 3,370,426
MASTER PISTON ACTUATOR
Clarence C. Fay, 17211 Edgewater Drive, Lakewood, Ohio 44107
Filed Nov. 12, 1965, Ser. No. 507,381
6 Claims. (Cl. 60—54.5)

ABSTRACT OF THE DISCLOSURE

This invention provides in a system for operating at least one pair of pistons movable along parallel axes in response to a single force and applied along an axis which is parallel to the piston axes means which coact between the pistons and the point of application of the force for dividing the force into unequal components which are applied to the pistons to move them along their respective axes.

This invention relates to hydraulic systems, and more particularly to plural isolated systems operated by a single manual or pedal operator.

This invention will be described in relation to a dual hydraulic braking system particularly useful in automotive vehicles, for example, trucks, cars, etc. it being understood, however, that this invention is applicable in any hydraulically operated mechanism which employs plural hydraulic control systems, e.g. hydraulic earth mover controls.

In automotive vehicles the front and rear brakes are more frequently being controlled by two separate hydraulic sub-systems, each sub-system having its own master cylinder, and both being actuated by a single pedal operator. The master cylinders are in communication with a fluid reservoir which provides fluid to the master cylinders. Pistons within the cylinders are driven by the brake pedal and transmit, by a hydraulic means, fluid under pressure sufficient to operate auxiliary brake cylinders located at each wheel to force the brake shoes or plates against a rotating drum or disc, as the case may be. In such hydraulic systems including plural hydraulic sub-system driven from a single operator, e.g., a brake pedal, it is desirable to provide means for equalizing the force supplied to each separate hydraulic sub-system. Unequal fluid pressure, or piston movement is caused, for example, by uneven wear or adjustment of brake shoes or plates, a slight leak in the line, difference in friction losses in the lines, improper sealing about the pistons, etc.

In some automotive vehicles it has been found advantageous to provide different hydraulic braking systems at the front and rear wheels in order to provide better braking action. Such systems require different fluid volumes or pressures to actuate the front and rear wheel brakes. This invention is particularly well suited for use in conjunction with such different hydraulic braking systems.

Two methods are presently employed for providing different volumes or pressures of hydraulic fluid to the differentially sized front and rear wheel brakes. Before explaining these methods it should be understood that it is desirable and advantageous to use pistons of like diameter for actuating the auxiliary pistons located at each wheel for operating the brakes. Similarly, it is desirable to use brake lines of like cross-section leading from the pistons to the auxiliary brake actuating cylinders.

In the first system cups or pistons of different diameter are used in the front and rear auxiliary brake cylinders. Such differently sized cups will operate efficiently only if the pressures in the brake lines are equalized or nearly so. The tendency for the hydraulic pressure in the brake line leading to the larger diameter cups to drop below the hydraulic pressure in the other line is overcome by applying a greater force on the hydraulic fluid in the line leading to the larger cups.

The second method employs cups or pistons of equal size or diameter. In this method, differential hydraulic fluid pressures must be applied against the similarly sized cups, the greater fluid pressure being applied in the brake line leading to the cups for operating the brakes at the wheels having the greatest fraction. The increase pressure agaisnt one set of cups is produced by applying a greater force against the hydrualic fluid.

The improved master piston actuator of this invention is designed to provide a suitable force in each of the brake lines used in either of the above-mentioned methods. This invention may also be embodied in a device which includes safety take-over means to insure positive action of at least one set of brakes in case one of the hydraulic or brake lines is ruptured.

Generally speaking, and in accordance with this invention, differential movement of the piston relative to each other is accomplished by providing a rocking beam cross member coacting between the pistons to transmit an axial force to each of the pistons proportional to the hydraulic resistance of each sub-system. A piston actuator is disposed between the adjacent pistons and coacts between the driving means, such as a push rod or Pitman extending from and connected to the foot pedal, and the rocking beam cross member to transmit axially directed components of force from the driving means to the cross member for at least a portion of the stroke of the actuator. Means are also provided coacting between the actuator, and each of the adjacent pistons for transmitting axially directed components of force from the driving means directly to either one of the pistons when the hydraulic resistance of the sub-system actuated by said piston falls below a predetermined value, such as for example as would be caused by a rupture in the line reducing the resistance to the summation of atmospheric pressure and the pressure losses in the line between the rupture in the line and the piston.

With this structure, so long as there is equal pressure in the cylinders, the pistons will move in unison. However, should there be a differential in the pressure in the master cylinders, the rocking beam cross member will allow the coacting piston in the cylinder where the fluid pressure is lower to move relative to the other piston, an extremity of the rocking beam advancing more rapidly on the low pressure side than the extremity on the high pressure side. In the usual cases, this movement is quite limited and will compensate for any pressure differentials such as normally encountered.

More particularly, this invention is in a hydraulic fluid braking system having a pair of isolated hydraulic sub-systems requiring different amounts of hydraulic fluid for their operation. Each system includes a master cylinder, means for supplying hydraulic fluid to the cylinder, and a piston slidable in the master cylinder for applying force against the hydraulic fluid in each of the sub-systems.

In accordance herewith, there is provided means for driving the pistons in a fluid displacing direction and for axially applying against the pistons, differential components of a singly directed force for moving the pistons.

The piston driving means includes: a cross beam member coacting between the pistons for transmitting differential components of said single axial force, to each of said pistons; a piston actuator disposed between, and movable with the pistons as the single axial force is applied thereagainst; and means coacting between said piston actuator and said cross beam member for transferring said single axially applied force from the piston actuator to the cross beam member, such that the components of said single axial force, transmitted to said master pistons are different and sufficient to operate the hydraulic sub-systems.

As indicated above, there may also be provided means coacting between the actuator and each of the adjacent pistons in the form of safety stops or lugs, for example which are adapted to coact with shoulders at the extremities of the piston should there be any substantial pressure differential, for example, such as caused by a ruptured hydraulic line in one of the hydraulic sub-systems. The amount of travel which must be undergone before the safety device coacting between the actuator and each of the pistons takes over is of the order of 0.0″ to 3⁄16″, and should substantial pressure differences occur, the coacting means positively engage the end of the piston movable in the cylinder where there is greater pressure to directly drive the piston in a pressure applying direction so that there will always be available positive braking action in the system having greater resistance or fluid pressure. Thus, within this relatively short distance, effective equalizing can be accomplished when each master cylinder is offering hydraulic resistance to piston movement; and if hydraulic resistance in one of the sub-systems is lost due to the line rupture, for example, the amount of pedal travel necessary to cause take-over and direct drive of the remaining piston is very slight.

This invention may also be embodied in a device including novel means for bleeding air from the master cylinders.

This invention may also be embodied in devices including a divided reservoir with an improved air chamber structure hereinafter described which provides a separate fluid source for each hydraulic system. With the conventional single compartment reservoir, the fluid may be completely drained from the system, if, for example, one of the brake lines is ruptured. Separate reservoirs provide greater protection in that fluid is still available in one set of brakes even if one line is ruptured.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is a diagrammatic illustration in perspective showing an automotive braking system for separately operating a front wheel brake hydraulic sub-system and a rear wheel brake hydraulic sub-system.

Figure 10:
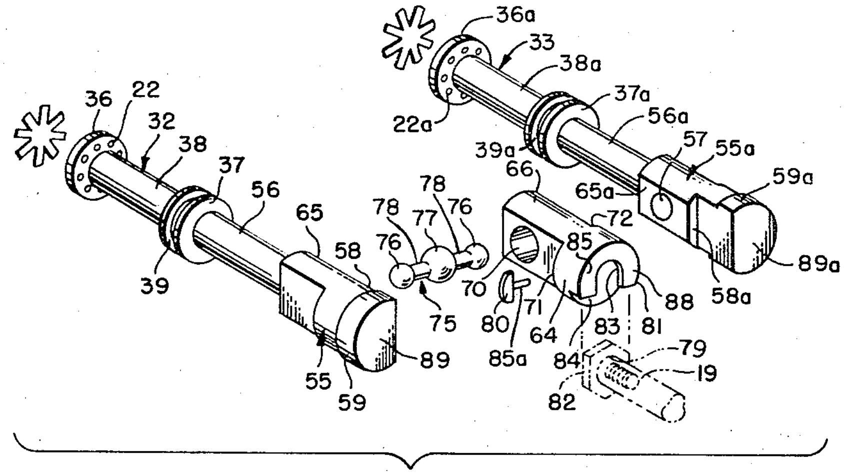

FIG. 10 is an exploded perspective view of the pistons actuating each of the hydraulic sub-systems, the rocking beam cross member which coacts between the pistons, the piston actuator which coacts between the driving means and the rocking beam cross member, the take-over means which operates in the event of failure of one of the hydraulic sub-systems, and partially shown in dotted lines, the end of the driving Pitman and its coupler adapted to coact with the piston actuator.

Figure 11:
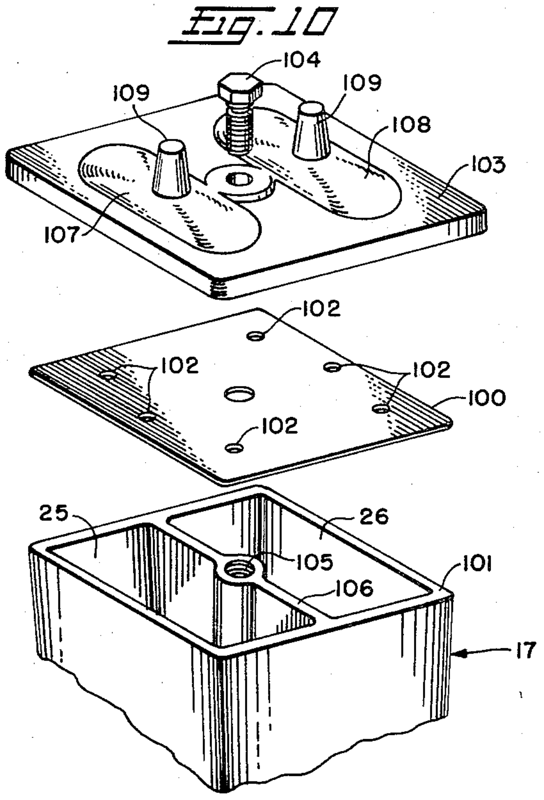

FIG. 11 is an exploded view of the fluid reservoir assembly showing a portion of the reservoir, the gasket, and the cap, and cap fastening means in perspective.

Figures 12, 13, 15:
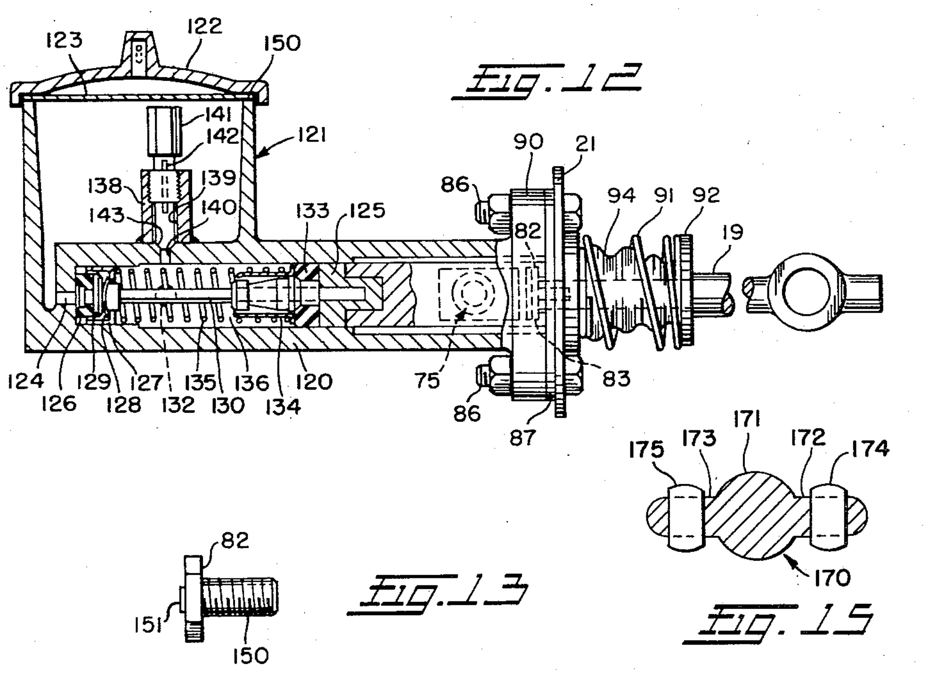

FIG. 12 is a cross-sectional view of another embodiment of the master piston actuator of the present invention showing a different fluid actuating structure.

FIG. 13 is an elevation of a coupler flange and threaded shank for the distal end of the Pitman drive bar.

Figure 14:
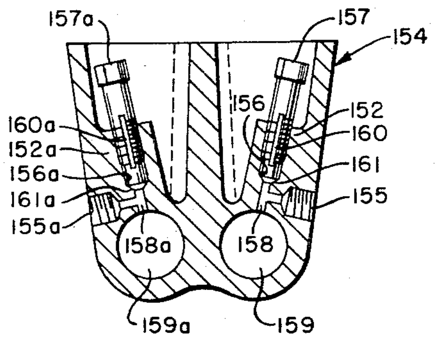

FIG. 14 is a cross-sectional view of a modified reservoir showing an improved air bleeder and interior structure for use with the type of actuator shown in FIG. 12.

FIG. 15 is an enlarged cross-sectional view of an embodiment of the "wobble bar" utilizing ferrules to centrally offset the fulcrum or pivot ball.

Figure 16:
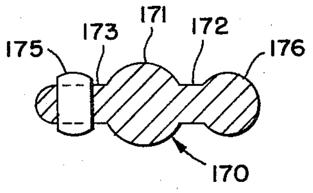

FIG. 16 is an enlarged cross-sectional view of another embodiment of the wobble bar utilizing one ferrule for offsetting the fulcrum or pivot ball.

Figure 17:
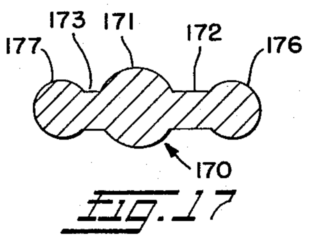

FIG. 17 is an enlarged cross-sectional view of still another embodiment of the wobble bar with a centrally offset fulcrum or pivot ball.

Figure 18:
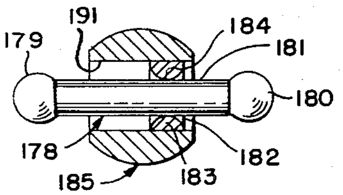

FIG. 18 is an enlarged cross-sectional view of still another embodiment of the wobble bar and other means for centrally offsetting the fulcrum, or changing the length of the lever arms actuating either of the pistons.

Figure 19:
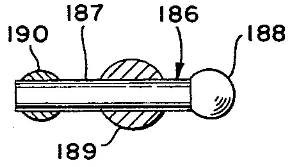

FIG. 19 is another embodiment of a wobble bar.

As indicated above, FIG. 1 shows diagrammatically a dual hydraulic braking system for use in an automotive vehicle. One hydraulic sub-system actuates auxiliary cylinders of conventional design located at the front wheels 14 and a separate hydraulic sub-system actuates auxiliary wheel cylinders located at the rear wheel brake assemblies 11. There is provided a master piston actuator 18 having on one side thereof a master cylinder portion indicated at 15 which communicates by means of hydraulic lines 16 with the auxiliary pistons in brake assemblies 14 at the front wheels for actuating the braking mechanism which is of conventional design of either the drum type, or the disc type. A separate master cylinder portion 12 communicates by means of hydraulic lines 13 to each of the rear link assemblies 11 for actuating conventional auxiliary hydraulic pistons therein. Hydraulic fluid reservoir 17 is conveniently mounted integrally with the cylinder housing, and the entire assembly which is usually a single casting secured to the fire wall 21. The master piston actuator assembly is driven from a single manually operated foot pedal 20 conventionally mounted within the cab of the automotive vehicle, not shown, connected to and driving a Pitman bar which, as will be hereinafter more particularly pointed out, is removably connected to the master piston actuator. This assembly makes possible easy removal and replacement of the master piston actuator by simply disconnecting hydraulic lines 13 and 16, removing the bolts securing the housing 18 to the fire wall 21, and as will hereinafter be pointed out slidably disconnecting the coupling of the Pitman 19 and the actuator assembly. Referring generally to FIGS. 2 to 5, 9 and 10 and more particularly to FIGS. 2 and 3, there is shown the master piston actuator assembly 18 comprising a pair of adjacently disposed master cylinders 12 and 15 which preferably, although not essentially, lie in the same horizontal plane. The master cylinders, preferably, have the same diameter. The fluid reservoir assembly 17 is compartmented into isolated sections or reservoirs 25 and 26, each section communicating with its respective master cylinder through a pair of spaced passageways 27 and 28, passageway 27 being restricted in a conventional way to limit back flow on the pressuring stroke. Each master cylinder communicates with its respective hydraulic brake line, e.g. line 13 through a suitable fitting 29 which is conveniently threadably engaged in passageway 30 communicating with the end 31 of the master cylinder. A hydraulic subsystem as that term is used herein, includes a piston, a cylinder, hydraulic lines, hydraulic fluid in the system, and servo motor means, such as, the auxiliary hydraulic cylinder-pistons at each of the wheels, which are not shown.

Pistons 32 and 33, respectively, are insertable in the other open end 34 of master cylinders 12 and 15 and are reciprocable therein. The fluid displacing piston end 35 nearest the outlet port 30 has a pair of piston lands 36 and 37 disposed in spaced relation on the piston body 38. Piston land 37 is conveniently provided with a circumferential recess or groove 39 for containing a pliable sealing ring 40.

Spring 45 is disposed in each master cylinder and coacts between cylinder end 31 and the adjacent piston end 35 biasing the piston in the direction away from the outlet port in a pressure relieving direction. A resilient sealing cup 46 coacts between spring 45 and piston head 35. Resilient cup 46 provides a sealing gasket on the pressurizing stroke for forcing the hydraulic fluid from the master cylinders into the brake lines. The spring-cup-piston assembly and operation is conventional. The opposite end of spring 45 surrounds and retains a conventionally designed check valve 48 over the outlet port 30. Check valve 48 is seated on a novel resilient frusto-conically shaped valve seat 44 having an aperture 49 through which the hydraulic fluid is metered to the outlet port 30 for distribution to the brake lines 13 and 16, respectively. Valve seat 44 is designed so that the valve 48 will always be seated on the pressure stroke even when its axis is tilted with respect to the axis of the cylinders 12 or 15.

Figure 9:
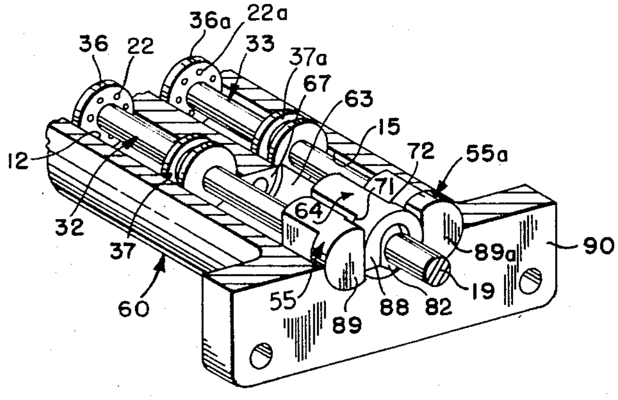
FIG. 9 is a perspective view of a portion of the master piston actuator of the present invention, the cylinder body being shown in cross-section, and the pistons and piston actuator being shown in perspective in position in the cylinder body.

Fluid in each of the reservoirs 25 and 26 is in constant communication with the reciprocating space or chamber 50 surrounding piston rod 38 between the piston lands 36 and 37 for the entire piston stroke. Fluid from chamber 50 replenishes fluid lost or spurted through port 27 by flowing through holes 22 in land 36 (FIG. 9). A conventional multi-fingered leaf check valve (see FIG. 10) controls the flow through holes 22.

Each piston is provided with an adapter 55 disposed on the driving end 56. Adapters 55 and 55*a* on the two pistons 32 and 33, respectively, are similar but are oppositely configured and in confronting relation when the pistons are normally disposed in non-operating position within the respective master cylinders 12 and 15, respectively. Each of the adapters 55 and 55*a* has a transversely extending opening or socket 57, the axis of which is at right angles to the longitudinal axis of the piston. Socket 57 is adapted to receive one end 76 of rocking beam cross member 75 (FIG. 10), and to allow limited rotational movement of the cross head 75 therein, which limited movement exceeds any demands on the movement of the cross member 75 which may be imposed by the assembly.

An abutment or shoulder 58*a* and 58 is formed in each of adapters 55*a* and 55 adjacent the opening or socket 57. Adapters 55 and 55*a* are each provided with a terminal driving head portion 59 and 59*a* respectively which is sized and shaped to fit smoothly within the bore of cylinders 12 and 15, respectively, and to coact with piston lands 36 and 36*a*, and 37 and 37*a* to keep pistons 32 and 33 operating smoothly within their respective cylinders. Bore 63 extends into the cylinder block 60 between and in overlapping relationship with the master cylinders 12 and 15. Bore 63 does not extend as far into the cylinder block 60 as cylinders 12 and 15 and provides, therefore, an abutment 67 (FIG. 9) which serves as a limit to the piston stroke and prevents damage to the spring, check valve, flexible cup assembly because of the overlap of bore 63 with the bores forming cylinders 12 and 15, respectively, the walls of the latter cylinders are partially removed and enable communication through rocking beam cross bar 75 between the adapters 55 and 55*a* on each of the pistons 32 and 33, respectively. A piston actuator or carrier 64 is slidable in bore 63 and is disposed between the confronting flats of adapters 55 and 55*a*. The confronting surfaces 65 and 65*a*, and 66 (FIG. 10) on the piston actuator 64 and adapters 55 and 55*a*, respectively, are complementarily configured for abutting relationship, albeit a relatively axially sliding relationship.

An opening or bore 70 is formed through the piston actuator 64 at right angles to the longitudinal axis thereof. Bore 70 is in axial alignment with the confronting sockets 57 and 57*a* in the adapters 55 and 55*a* when the pistons are in their respective position in master cylinders 12 and 15.

The rocking beam cross member or wobble bar 75 extends through the actuator opening 70 and into the confronting sockets 57 and 57*a* in the adapters 55 and 55*a*. Cross member 75 is conveniently provided with terminal ball portions 76 at each of its extremities for coaction with desirably spherically shaped sockets 57 and 57*a* in the piston adapters 55 and 55*a*. In the embodiment of the wobble bar, illustrated in FIGS. 2, 3, 5 and 10, the ball portions 76 are spaced from a centrally located spherical fulcrum element or pivot ball 77 by means of spacing arms 78. Thus, when the cross head 75 is assembled with the pistons 32 and 33 with actuators 64 in the cylinder body 60 as best shown in FIG. 9, a single axially directed force on Pitman bar 19 is transmitted through the actuator 64, to the rocking beam cross member 75, and then through the arms 78 to the ball portions 76 to the pistons 32 and 33, respectively, through coaction with the sockets 57 in the adapter heads 55 and 55*a*. Thus, a single axially directed force is transmitted to each of the pistons to drive pistons 32 and 33 in an axial direction and apply pressure to hydraulic fluid contained in the cylinders 12 and 15 ahead of the piston lands 36. Differences in pressure exerted on the high pressure extremities of pistons 32 and 33 result in a differential movement of pistons 32 and 33 in response to the resistance offered by the hydraulic systems, respectively. Because of the slidable relationship existing between adapters 55 and 55*a* on each of the pistons 32 and 33 and the parallel flat surfaces on piston actuator 64, and because of the ability of rocking beam cross member 75 to rock or wobble within bore 70, one of the pistons 32 or 33 is permitted to lead the other as may be required to establish equal pressure in each of the hydraulic sub-systems.

Another embodiment of the wobble bar is illustrated in FIG. 17. This type wobble bar is utilized in conjunction with hydraulic sub-systems requiring different volumes of fluid for their successful operation. In the embodiment, the ball portions 176 and 177 are differentially spaced from a centrally offset spherical fulcrum element or pivot ball 171 by means of spacing arms 172 and 173. When the cross head 170 is in assembled relation with pistons 32 and 33 and actuator 64, a single axially directed force on Pitman bar 19 is transmitted through the coupled actuator 64, and to the rocking beam cross member 170 through the fulcrum element 171. Because of the centrally offset position of the fulcrum element relative to the ball portions 176 and 177, the components of the single axially directed force exerted on the fulcrum element 171, are different and not equal, and different forces are applied against the pistons 32 and 33, respectively, through coaction with the sockets 57 in the adapter heads 55 and 55*a*. The greater component of force is exerted on the piston closest the fulcrum element 171, or in the brake line leading to the hydraulic sub-system requiring the larger volume of or pressure on the hydraulic fluid. The component of force required to operate this sub-system can be determined. Finding the centrally offset position of the fulcrum element 171 is then a matter of simple mechanics.

The pistons 32 and 33, in turn, move in an axial direction and the components of force applied against the hydraulic fluid contained in their respective cylinders 12 and 15 ahead of the piston lands 36. Because of the slidable relationship existing between adapters 55 and 55*a* on each of the pistons 32 and 33 and the parallel flat surfaces on piston actuator 64, and because of the ability of rocking beam cross member 75 to rock or wobble within bore 70, one of the pistons 32 or 33 is permitted to lead the other as may be required to establish equal pressure in each of the hydraulic sub-systems, when the first method, previously indicated, for moving the differently sized cups, is used. This lead can be determined in each case. The sockets in the adapters could be offset the lead distance, so that the axis of the wobble bar is at right angles to the piston axes, as they move in unison. The same is true when the second method, previously referred to, is utilized for providing different volumes of hydraulic fluid to the sub-systems.

Referring to FIGS. 15, 16, 18 and 19, there are shown different embodiments of the wobble bar 170, which utilize different methods for centrally offsetting the fulcrum portion or pivot ball 171.

Figure 3:
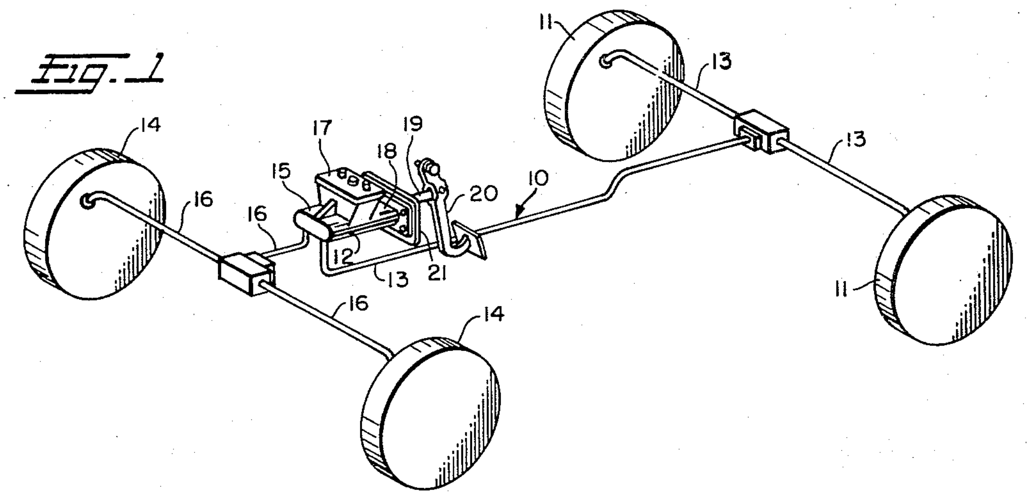
FIG. 3 is a top plan view of a master piston actuator assembly embodying the present invention.
Figure 5:
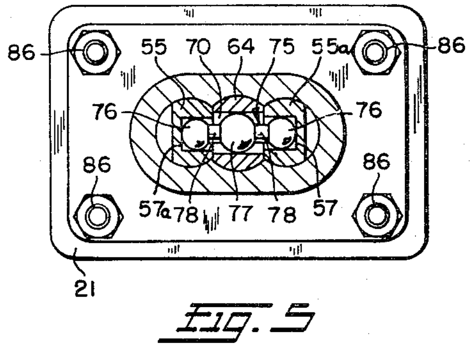
FIG. 5 is a view partially in cross-section of the master piston actuator of FIGS. 2 and 3 and taken in the plane indicated by the line 5—5 in FIG. 2.
Figure 6:
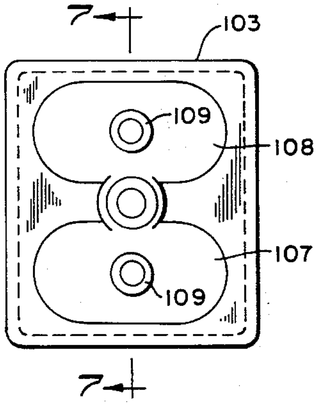
FIG. 6 is a top view of a fluid reservoir cover useful with the master piston actuators of the present invention.

The embodiment of the wobble bar 170 illustrated in FIG. 17 is similar to that shown in FIGS. 3, 5 and 10, that is, the fulcrum element or pivot ball 171 is integrally formed in centrally offset relation to the balls 176 and 177 at the extremities of the arms 172 and 173, respectively.

The embodiment in FIG. 16 utilizes a fulcrum element or pivot ball 171 which is centrally disposed on the wobble bar 170. A ferrule 175 is adjustably mounted on the spacing arm 173 and is used for centrally offsetting the fulcrum element 171.

The embodiment illustrated in FIG. 15 utilizes a fulcrum element 171 centrally disposed in relation to the spacing arms 172 and 173. A pair of ferrules 174 and 175 are adjustably mounted on the spacing arms 172 and 173, respectively, and are used to centrally offset the fulcrum element 171 in relation to the ferrules 174 and 175, the ferrules 174 and 175 being designed to coact with the adapter sockets, e.g., sockets 57 and 58, for driving the pistons 33 and 32, respectively.

The wobble bar 178 illustrated in FIG. 18, employs a fulcrum element 182 which is independent of the wobble bar 178. The fulcrum element 182 is slidable and adjustable in the bore 191 of an actuator 185. The fulcrum element 182 comprises an annulus 183 having an opening or passageway 184 extending through it. A spacing arm 181 extends through the annulus opening 184 and coacts with the annulus 183 of the fulcrum element 182, in a manner similar to the coaction between the pivot ball 77 with the walls of the piston actuator bore 70. A pair of similar pivot balls 179 and 180 are secured to the ends of the spacing arm 181. In this embodiment, the fulcrum element 182 is centrally offset in relation to the pivot balls 179 and 180 and their corresponding activating pistons, by adjusting the fulcrum element 182 in centrally offset relation within the activator bore 191.

The embodiment of the wobble bar 186 illustrated in FIG. 19, employs a spacing arm 187 with a fixed pivot ball 188 at one end. A fulcrum element 189 and another pivot ball 190 are adjustable on the spacing arm 187 by any suitable means, e.g., a set screw (not shown), or by pressing the fulcrum element 189 and pivot ball 190 firmly on the spacing arm 187 such that the pivot ball 190 is firmly secured to the opposing end of the spacing arm 187 in spaced relation from the other pivot ball 188, and the fulcrum element 189 is firmly secured to the spacing arm 187 in centrally offset relation between the pivot balls 188 and 190.

As indicated above, the apparatus of the present invention is provided with a safety take over feature involving the shoulders 58 and 58*a* on each of piston adapters 55 and 55*a*, respectively, and lateral coacting shoulders 71 and 72 formed on the actuator 64. Shoulders 71 and 72 are configured for mating engagement with the shoulders 58 and 58*a* on the adapters 55 and 55*a*. When the pistons 32 and 33 are equally pressurized by the resistance offered in the respective hydraulic systems, shoulders 71 and 72 on adapter 64 never come in contact with shoulders 58 and 58*a* on the respective adapter heads 55 and 55*a*. The spherical surface of portion 77 on rocking beam 75 coacts as a fulcrum with bore 70 and the simultaneous advancement of both pistons 32 and 33 is such that when taken with the normal axial spacing between shoulder 71 and shoulder 58 on piston 32, and the spacing between shoulder 72 and shoulder 58*a* on piston 33, such shoulders never come in contact with each other. However, when piston 32, for example, leads piston 33 in its movement in an axial direction, shoulder 72 approaches shoulder 58*a* on piston 33. If the lead exceeds a certain predetermined amount, such as, for example, 3/32″ to 3/16″, then shoulder 72 will seat upon shoulder 58*a* of piston 33, and the drive from Pitman 19 through actuator 46 will become a direct drive rather than an indirect drive through the cross member 75.

The amount of clearance between the shoulder 72 and 58*a* and shoulder 71 and 58 on piston 32 may be varied by inserting shim 80 on either side of the actuator 64. Shim 80 is conveniently provided with a pin 85*a* sized for a tight fit in bore 93*a* (FIG. 2) in actuator 64.

The ball portions and ferrules on the rocking cross beam members are conveniently sized for receipt in sockets 57 with a minimum amount of play. A clearance of 1 to 3 thousandths may be tolerated. If there is too much play between the respective parts, there is a tendency to negate the ability of the compensating piston to differentiate in response to minor differences in piston resistance.

In order that the spacing between the shoulders on the pistons and the shoulders on the actuator 64 should be about the same when the hydraulic sub-systems are at equal pressure, it has been found convenient to utilize a shim 80 as shown in FIG. 10. Shim 80 is secured to the actuator 64 by means of pin 85*a* and serves to equalize the spacing between the shoulders on pistons 32 and 33 and on actuator 64 at the time the pistons are each pressurized to the same extent. Under these circumstances, then, should failure occur in either sub-system the amount of travel before direct drive take-over is encountered will be the same.

The end 81 of piston actuator 64 adjacent fire wall 21 is detachably mounted on an enlarged removable flange or head 82 on Pitman rod 19. Flange 82 is suitably secured to the rod end 79 as by the illustrated threads coacting in a tapped bore in the end of Pitman 19. Flange 82 is slidably received in a complementarily configured recess or slot 83 formed between the adjacent actuator surface 84 and an arcuate or U-shaped cover 85 secured to or integral with the actuator 64 in spaced relation from the surface 84. Slot 83 and cover 85 are oversized with respect to the size of flange 82 so as to permit limited movement of the Pitman head or flange 82 therein. Such movement is necessary because of the manner in which the Pitman rod 19 is linked to the brake pedal arm 20.

Figure 2:
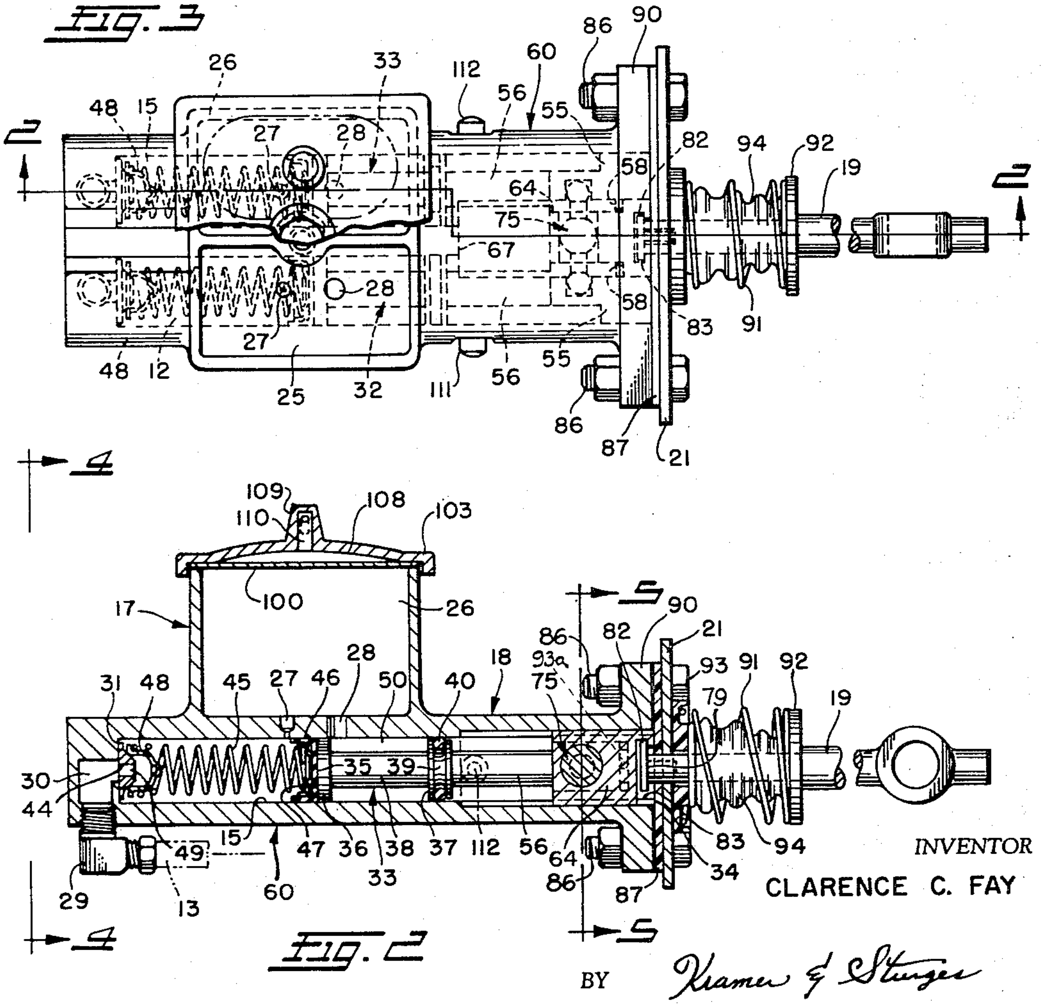
FIG. 2 is a cross-sectional view of a master piston actuator of the present invention taken on the stepped plane indicated by the line 2—2 in FIG. 3.
Figure 4:
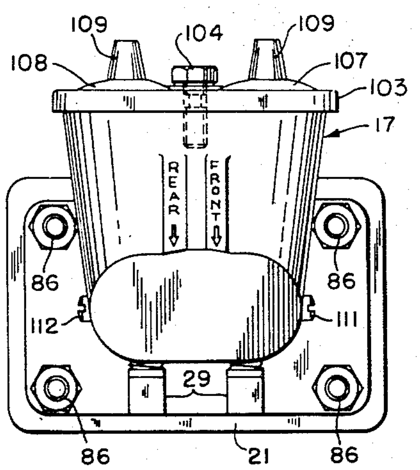
FIG. 4 is an end view of the master piston actuator of FIGS. 2 and 3.

In assembling the apparatus, the brake pedal arm 20 and Pitman rod or bar 19 are first mounted in the cab of the vehicle and a brake pedal 20 slightly depressed to move the Pitman rod through the fire wall 21 into the engine housing area. Flange head 82 is secured to the end of rod 79 by any suitable means, such as thread means, and when in position, abuts against the fire wall 21 and serves to maintain the Pitman rod in position. As best shown in FIG. 2 the Pitman rod 19 is biased in a direction away from the master cylinder assembly 18 by a helix spring 91 coacting between the fire wall 21 and an annular flange or stop 92 with the Pitman rod 19. Spring 91 coacts between thrust washer 93 and collar 92 to reset the brake pedal and also surrounds a flexible dirt shield or boot 94 which serves to seal off the opening through fire wall 21 and prevent dust and dirt from entering the activator assembly.

The master cylinder assembly 18 may then be easily mounted on the fire wall by any suitable means, e.g. bolts 86 and the flanged head 82 inserted in slot 83 in the end of actuator 64. It will be seen that this structure greatly facilitates installation and removal of the master piston actuating assembly. A gasket 87 is preferably placed between the assembly 18 and the fire wall 21.

Referring more particularly to FIGS. 6 to 8 and 11 there is shown in greater detail a fluid reservoir assembly 17. The reservoir assembly 17 comprises two compartmented sections or reservoirs 25 and 26 separated from each other by partition wall 106. Thus, each hydraulic sub-system has its own supply of hydraulic fluid. A pliable sealing gasket 100 is provided between the cap 103 and the reservoir body 101, said sealing gasket being provided with a plurality of breather holes 102 communicating with each of the reservoir sections 25 and 26 to allow movement of air. Cover 103 is secured to the assembly 17 by any suitable fastening means, such as a bolt 104 threadably secured in tapped hole 105.

Figure 7:
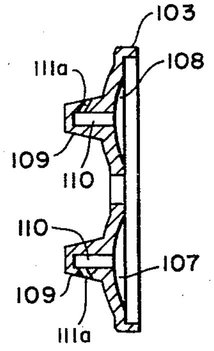
FIG. 7 is a cross-sectional view of the fluid reservoir cover shown in FIG. 6 as it appears in the plane indicated by the line 7—7 of FIG. 6.
Figure 8:
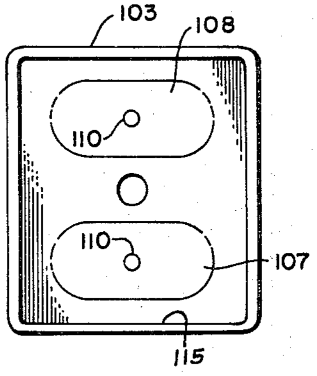
FIG. 8 is a bottom view of the fluid reservoir cover shown in FIGS. 6 and 7.

Cover 103 is provided with a pair of spaced apart bulbed portions or air pockets 107 and 108 which, when the cover is in position on the reservoir body 101 are disposed above each of the reservoir portions 25 and 26, respectively. These pockets provide a suitable minimum of air space over the surface of the hydraulic fluid in each of the reservoir portions 25 and 26 to allow for movement of the fluid in each of the hydraulic sub-systems. In order to permit the sub-systems to "breath" vents 109 are provided, usually as integrally cast members with the cast cover 103. As best shown in FIG. 7 each vent 109 has a protected passageway 110 extending from the underside of the cover 103, and communicating with a downwardly directed lateral port 111*a* open to the atmosphere. The downwardly directed port 111*a* is conveniently disposed in the vent 109 so that foreign matter will not readily enter it and contaminate the hydraulic fluid in the reservoirs. Flange 115 (FIG. 8) is sized relative to gasket 100 to retain gasket 100 frictionally within cap 103. Cap 103 is desirably oblong so that it is automatically properly positioned with respect to the gasket 100 and the reservoir. Assembly of the reservoir with the cap 103, the gasket 100 and the bolt 104 is readily apparent from FIG. 11. The breather ports or holes 102 in gasket 100 allow for movement of air to or from chambers 107 and 108, and the reservoir chambers 25 and 26, respectively. Breather ports 102 are so located as to be out of alignment with ports 27 and 28 in each of the reservoir chambers 25 and 26. The reason for this is that when chamber 15, for example, is pressurized fluid spurts through the port 27 until port 27 is sealed off by movement of resilient cup 46 past the opening of port 27. When the brakes are suddenly applied, a jet of hydraulic fluid is formed having sufficient force to impinge against the gasket 100. Accordingly, gasket 100 desirably serves also as a baffle to prevent escape of hydraulic fluid.

In order to keep the pistons 32 and 33 within their respective cylinders 12 and 15 when the master piston actuator assembly 18 is removed from fire wall 21, there are provided a pair of retaining screws 111 and 112 (FIG. 3). Screws 111 and 112 are threaded into the cylinders 12 and 15, respectively, and serve to engage the piston lands 37 and thereby limit the extent or rearward travel of pistons 32 and 33 under the influence of springs 45 (FIG. 2) when the assembly is removed from the fire wall. After reinstalling the piston actuator assembly 18 and coupling it to the flange head 82 on Pitman rod 19, and securing the piston actuator body flange 90 to fire wall 21 by means of bolts 86, the retaining screws 111 and 112 remain fully inserted, but are prevented from any interference with the movement of pistons 32 and 33, by the fire wall gasket 87 against which ends 88, 89 and 89*a* (FIG. 9) abut.

FIG. 12 illustrates the embodiment of the present invention in a different type of hydraulic brake actuator mechanism enjoying wide popularity in Europe. In this device, the structure of the actuator mechanism for the pistons is essentially the same as shown in FIGS. 2, 3, 5, and 9, and also employs the wobble bars illustrated in FIGS. 15–19. The reservoir assembly, and the apparatus for feeding hydraulic fluid under pressure to the wheel cylinders for actuating the braking mechanism, whether of the disc or drum type, is somewhat different.

The apparatus shown in FIG. 12 provides, therefore, a cylinder body 120 integral with a reservoir 121 having a cap 122 and a gasket 123. Reservoir 121 is of substantially the same design as reservoir assembly 17 as shown in FIG. 2, for example. However, the means for feeding hydraulic fluid into the hydraulic sub-system is somewhat different, the inlet port 124 being provided at the extremity of the cylinder rather than intermediate the extremities of the cylinder bore as in the device shown in FIG. 2. Valve means are provided to close inlet port 124 on the pressurizing stroke of plunger 125, and include a resilient center valve seal 126, a valve spacer 127, a spring washer 128 and a valve 129 at the extremity of valve stem 130. Outlet port 132 communicates with one of the hydraulic sub-systems such as hydraulic line 13 (FIG. 1). The plunger 125 is provided with an elastomeric plunger seal 133 against which there is held in abutting relation spring thimble 134 by means of compression spring 135. On the pressurizing stroke moving from right to left as shown in FIG. 12, valve 129 is seated against resilient valve seat 126 closing inlet port 124 to the flow of hydraulic fluid from reservoir 121. The hydraulic fluid then trapped within chamber 136 is pressurized and forced through the side outlet 132.

In order to bleed air out of the system, there may be integrally cast with the cylinder housing 120 an elongated member 138 which is drilled to provide an oversized bore 139, and counterbore to provide an opening 140 into the fluid chamber 136. The outer portion of the of the elongated member 138 is tapped to receive bleeding pin 141 which acts as a valve with respect to opening 140 closing the opening by seating thereon, pin 141 being provided with a keyway 142 to exhaust air when pin 141 is backed off of its seat 143. The uppermost portion of keyway 142 is desirably maintained below the fluid level in reservoir 121 so that on the return stroke, no air is drawn into the system. Pin 141, however, desirably has a hex-head shape to receive a suitable wrench, the top-most portion of pin 141 being desirably just below the upper lip 150 of reservoir 121.

In all other respects, the structure of the apparatus or device shown in FIG. 12 is the same as that shown in FIGS. 3 and 2.

FIG. 13 is a side view of the flange 82 showing a threaded stud 150 for securing it to the end of Pitman 19. There is provided also a projection or boss 151 on the exposed or forward face of flange 82 which coacts with the rear surface 84 of actuator 64 to facilitate the slight rocking action which will be undergone by Pitman 19 during its operation by the foot pedal.

FIG. 14 shows a cross section of another embodiment of a reservoir particularly useful with the structure shown in FIG. 12. In this embodiment, the bleeder bosses 152*a* and 152 are integrally cast with the actuator body 154 and drilled and tapped for direct communication with the fluid outlets 155*a* and 155, respectively. Bosses 152*a* and 152 are each obliquely drilled to provide an oversized bore 156*a* and 156 which is suitably tapped to receive bleeder pins 157*a* and 157, respectively. Pins 157*a* and 157 are provided with a key-way type slot 160*a* and 160 for allowing escape of air when the pins are backed off seats 161*a* and 161. In all other respects, these bleeders function as the bleeder illustrated in FIG. 12.

Other modes of applying the principle of this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. In combination:

(a) a pair of pistons movable in the same direction along axes which are parallel, for displacing fluid in a pair of brake lines, the pistons having a pair of oppositely disposed sockets therein;

(b) a piston actuator movable with said pistons as a single axial force is applied thereagainst, the piston actuator movable along an axis parallel to, and equidistant from the piston axes, the piston actuator having an opening extending therethrough which can be axially aligned with the sockets in the pistons;

(c) a rocking beam cross member extending through the opening in the piston actuator into the sockets of the pistons, said member having a ball disposed on each free end for coaction with the corresponding adjacent piston socket, a ball and socket joint being formd therebetween; and (d) means coacting between said piston actuator and said rocking beam cross member for transferring the single axially applied force from the piston actuator to the rocking beam member, such that the components of said force applied against the pistons by said rocking beam cross member, are unequal.

2. The combination of claim 1 wherein the force transferring means includes a fulcrum coacting with the cross member in centrally offset relation to said cross member and said pistons.

3. The combination of claim 2 wherein the fulcrum is adjustable between the piston actuator and cross member.

4. The combination of claim 2 wherein the fulcrum includes a pivot ball on the cross member in centrally offset relation to the ends of said cross member.

5. The combination of claim 4, wherein the piston actuator is movable along an axis parallel and equidistant from the piston axes.

6. A dual hydraulic system comprising in combination:

(a) at least one pair of cups for operating a pair of isolated braking mechanisms, said cups having equal diameters;

(b) a hydraulic brake line communicating with each of said cups;

(c) a master cylinder communicating with each brake line;

(d) a piston slidable in each cylinder for exerting force against the hydraulic fluid in said brake lines, the pistons being movable along parallel axes;

(e) means for applying unequal components of a singly applied force against said pistons and moving them in a fluid displacing direction including:

(1) a piston actuator movable with said pistons as a single axial force is applied thereagainst, the piston actuator movable along an axis parallel to, and equidistant from the piston axes, the piston actuator having an opening extending therethrough which can be axially aligned with the sockets in the pistons;

(2) a rocking beam cross member extending through the opening in the piston actuator into the sockets of the pistons, said member having a ball disposed on each free end for coaction with the corresponding adjacent piston socket, a ball and socket joint being formed therebetween; and (3) means coacting between said piston actuator and said rocking beam across member for transferring the single axially applied force from the piston actuator to the rocking beam member, such that the components of said force applied against the pistons by said rocking beam cross member, are unequal.

References Cited

UNITED STATES PATENTS

| | | | |
|---|---|---|---|
| 1,822,900 | 9/1931 | Messier | 60—54.6 X |
| 2,074,718 | 3/1937 | Bohannan | 60—54.6 X |
| 2,191,987 | 2/1940 | Goepfrich | 60—546 X |
| 2,754,938 | 7/1956 | Gallay | 60—54.6 X |
| 3,049,885 | 8/1962 | Tuten | 60—54.6 |

MARTIN P. SCHWADRON, *Primary Examiner.*

ROBERT R. BUNEVICH, *Examiner.*